United States Patent
Smyth

(10) Patent No.: US 9,734,798 B2
(45) Date of Patent: Aug. 15, 2017

(54) TIMING-BASED SCHEDULING FOR COMPUTER-GENERATED ANIMATION

(71) Applicant: DreamWorks Animation LLC, Glendale, CA (US)

(72) Inventor: Evan P. Smyth, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 14/660,837

(22) Filed: Mar. 17, 2015

(65) Prior Publication Data
US 2016/0275915 A1 Sep. 22, 2016

(51) Int. Cl.
| | | |
|---|---|---|
| G09G 5/18 | (2006.01) | |
| G06F 9/50 | (2006.01) | |
| G06T 13/00 | (2011.01) | |
| G06T 15/00 | (2011.01) | |
| H04L 29/08 | (2006.01) | |

(Continued)

(52) U.S. Cl.
CPC .............. *G09G 5/18* (2013.01); *G06F 9/50* (2013.01); *G06T 13/00* (2013.01); *G06T 13/80* (2013.01); *G06T 15/005* (2013.01); *G09G 5/003* (2013.01); *H04L 67/00* (2013.01); *G09G 2370/02* (2013.01)

(58) Field of Classification Search
CPC ......... H04L 65/60; H04L 41/22; H04L 65/80; H04L 67/322; H04N 21/458; G06K 15/1861; G06K 15/1822; G06K 15/186; G06T 13/20; G06T 13/80; G06T 1/20; G06T 15/005; G06T 13/00;

(Continued)

(56) References Cited

U.S. PATENT DOCUMENTS

| | | | | |
|---|---|---|---|---|
| 5,428,717 A | * | 6/1995 | Glassner | G06T 17/00 345/419 |
| 2009/0079763 A1 | * | 3/2009 | Takeichi | G06T 1/20 345/630 |
| 2012/0147387 A1 | * | 6/2012 | Morrison | G06K 15/1861 358/1.1 |

FOREIGN PATENT DOCUMENTS

| | | |
|---|---|---|
| WO | 2009/138878 A2 | 11/2009 |
| WO | 2009/138878 A3 | 5/2010 |

OTHER PUBLICATIONS

Hsu et al., A Job Scheduling Design for Visualization Services using GPU Clusters, 2012 IEEE International Conference on Cluster Computing, pp. 523-533.*

(Continued)

*Primary Examiner* — Haixia Du
(74) *Attorney, Agent, or Firm* — Morrison & Foerster LLP

(57) ABSTRACT

A method of scheduling and performing computations for generating an interactive computer-generated animation on behalf of a client device to achieve a desired quality of service includes generating a computational configuration of computations that, when performed, produce the computer-generated animation with the desired quality of service. The configuration includes an identification of a first computation that outputs first data, a first start time for the first computation, and a first end time, where the first computation is to end before the first end time. The configuration also includes an identification of a second computation that depends on the first data, and a second start time for the second computation. The first computation is performed in response to an occurrence of the first start time and the second computation is performed in response to an occurrence of the second start time.

30 Claims, 6 Drawing Sheets

(51) Int. Cl.
  *G06T 13/80*   (2011.01)
  *G09G 5/00*   (2006.01)
(58) Field of Classification Search
  CPC ..... G06T 2213/04; G06T 15/00; G06T 17/00;
       A63F 13/57; A63F 2300/64
  See application file for complete search history.

(56) References Cited

OTHER PUBLICATIONS

Gantman et al., "Scheduling Real-Time Tasks in Distributed Systems: A Survey", available at https://cseweb.ucsd.edu/classes/fa98/cse221/OSSurveyF98/p8.pdf, Nov. 22, 1998, pp. 1-13.
Yun et al., "Deterministic Real-time Thread Scheduling", Arxiv.org, Apr. 12, 2011, 4 pages.
Extended European Search Report (includes European Search Report and Search Opinion) received for European Patent Application No. 16160722.1, mailed on Aug. 9, 2016, 9 pages.
Office Action Received for European Patent Application No. 16160722.1, dated May 31, 2017, 5 Pages.

* cited by examiner

TIMING-BASED SCHEDULING FOR COMPUTER-GENERATED ANIMATION

BACKGROUND

1. Field

This application relates generally to techniques for scheduling computational processes and, more specifically, to scheduling computational processes for computer-generated animations.

2. Description of the Related Art

Computer animation is the process of generating animated images using computer graphics. FIG. 1 depicts an example of a computer-generated image. A computer-generated scene may include a virtual environment including various objects (e.g., trees, rocks, clouds, etc.) and characters (e.g., animals, people, etc.). Models of characters, for example, may be created and then moved or deformed to simulate motion. Images of the scene are rendered at selected times or frames to create an animated video.

The computer animation processes can be computationally demanding in terms of the number of computations and the amount of computer memory required. The computational resources required to store the data underlying the environment, objects, and characters and to generate a video depend on various factors including the number and size of the characters being animated, the resolution of the characters, the resolution of the rendered images, and the complexity of the models used to determine character motion.

For even moderately complex animations, many personal electronic devices, such as smartphones and tablets, may lack the processing and memory resources necessary to produce video-quality animations in real-time (e.g., to produce computer-generated images with 720p or 1080p resolution at approximately 24-30 frames per second (fps)). For example, a smartphone is unlikely to have enough processors with sufficient speed to generate a new image every 33 milliseconds (ms) (i.e., the frame time of a 30 fps video). Furthermore, even a typical personal computer is unlikely to have the memory capacity required to store the underlying data of complex virtual characters and scenes, or the processing power to generate a video-quality animation in real time.

One potential solution to this problem is to use a remote machine to store the data and perform the animation processing as a service, and then deliver the output to a client device. However, even if the resources for animation are located remotely, there is still a need to allocate processing resources such that an acceptable quality of service is provided.

Quality of service may be defined at least in part by the frame rate of the video, resolution of the rendered video, or resolution of the computer-generated environment and characters. Quality of service may also depend on the percentage of rendered frames that are fully updated such that the rendered image appears as it would if unlimited resources were available. Some users may prefer a fully updated image at every frame at the cost of a slower frame rate or temporary interruptions while the image is being updated or buffered. Temporary interruptions result in a slower effective frame rate. Other users may prefer a faster frame rate without interruptions, at the cost of occasionally receiving a partially updated or non-updated image at each frame. Some users may also be willing to sacrifice frame rate or tolerate interruptions for images with higher resolution.

Maintaining an acceptable quality of service may be manageable in some situations. For example, if the parameters of the scene (e.g., the number, resolution, and motions of the characters in the scene) are not very demanding or are known in advance, the computations required to generate images can be determined in advance and sufficient resources may be allocated to perform the computations at a reliable rate. The computations may be configured based in part on the inputs required by each computation. For example, if computation B requires data produced by computation A, then computation A is scheduled to occur before computation B. Furthermore, an event-driven scheme may be implemented in which computation B is triggered by the completion of computation A. Thus, computation B waits to start until computation A has completed, thus ensuring that computation B will always have the data it requires.

An event-driven system, however, may be unable to achieve a desired frame rate if one or more computations take longer than expected. If a computation does not complete on time, all subsequent computations are delayed. Moreover, the delay experienced by downstream computations is compounded as more computations exceed their estimated duration. If the delay is large enough, an event-driven scheduling scheme may fail to meet some aspect of the quality of service, such as frame rate.

Maintaining a desired quality of service with an event-driven schedule may be even more difficult for applications in which the parameters of a scene are not predetermined and the exact amount of resources that will be required at any particular time is unknown. In an interactive system, for example, a user may be able to provide real-time input that affects the animation. Since the animation cannot be predetermined, the system has to generate imagery in response to the user input. Not only does the system have to generate images on-the-fly, but it also may require additional resources to process the user input and determine the appropriate response. The uncertainty in the resources that may be required to meet a particular quality of service becomes even greater if the system allows an unknown number of users to demand resources at the same time.

A system with uncertain demand could be designed to meet the desired quality of service at the maximum expected load. However, this would likely be inefficient as it could leave a large portion of available resources unused a majority of the time.

Thus, there is an opportunity to develop techniques to allocate and consume computational resources to generate real-time computer-generated imagery with a reliable quality of service.

SUMMARY

The present disclosure describes an adaptable time-based process for performing a computer processing service on behalf of a client application. The client application may include a process, program, application, or the like, running on a remote or local device. The time-based process differs from event-based approaches in which computations are initiated by computational events such as the completion of another computation or delivery of data. The time-based process may be applied to computational processes in which a reliable or deterministic output rate is desired. The adaptability of the disclosed techniques may provide for more efficient allocation of available computational resources. This may reduce the amount of physical hardware required and/or provide greater ability to maintain a desired quality of service without large variations in resource requirements. Being able to reduce variation in resource requirements may be particularly advantageous for embodiments in which the amount of resources is not scalable.

The present disclosure describes exemplary embodiments of the time-based approach applied to an interactive animation system for providing a real-time, or near-real time, personalized interaction with a virtual character. A behavior of the character may be based on a user input to the client device.

In one embodiment, a method of scheduling and performing computations for generating an interactive computer-generated animation on behalf of a client device to achieve a desired quality of service includes generating a computational configuration of computations that, when performed, produce the computer-generated animation with the desired quality of service. The computational configuration includes an identification of a first computation configured to output first data when the first computation is performed, a first start time at which the first computation is to begin, and a first end time, where the first computation is to end before the first end time. The computational configuration also includes an identification of a second computation configured to depend on the first data as an input, and a second start time, after the first end time, at which the second computation is to begin. The first computation and the second computation are performed according to the computational configuration to create a first frame of the computer-generated animation. Performing the first computation and the second computation according to the computational configuration includes performing the first computation in response to an occurrence of the first start time and performing the second computation in response to an occurrence of the second start time.

In one embodiment, the second computation is performed in response to the occurrence of the second start time independent of whether the first computation ends before the second start time. In another embodiment, the computational configuration is generated based on past performance of the first computation and the second computation. In yet another embodiment, the computations are configured to determine a behavior of an animated character based on a user input to the client device.

In one embodiment, the method includes monitoring the performance of the first computation during creation of the first frame of the computer-generated animation. The computational configuration is modified to create a modified computational configuration, and the first computation and the second computation are performed according to the modified computational configuration to create a second frame of the computer-generated animation.

In one embodiment, the time at which the first computation outputs the first data is determined, and the computational configuration is modified in response to a determination that the time at which the first computation outputs the first data is after the second start time. Modifying the computational configuration may include increasing the first end time, increasing the second start time, decreasing the first start time, and/or reducing the number of operations in the first computation.

In one embodiment, the computational configuration includes first resource data representing a first computational resource upon which a first portion of the first computation is to be performed. Second resource data may be added to the computational configuration that represents a second computational resource upon which a second portion of the first computation is to be performed.

In one embodiment, the quality of service includes a frame time that defines an amount of time in which the computations for a frame of the computer-generated animation are to be completely performed. The computational configuration is generated such that the computations for the frame are completed in a lesser amount of time than the frame time.

In one embodiment, a system includes at least one computing resource configured to perform the method described above. In another embodiment, a non-transitory computer-readable storage medium includes computer-executable instructions for performing the method described above.

The embodiments depicted in the figures are only exemplary. One skilled in the art will readily recognize from the following discussion that alternative embodiments of the structures and processes illustrated herein can be employed without departing from the principles described herein.

DETAILED DESCRIPTION

The following description sets forth specific configurations, parameters, and the like. It should be recognized, however, that such description is not intended to limit the present disclosure, but is instead provided as a description of exemplary embodiments.

Figure 1:
FIG. 1 depicts a computer-generated image.
Figure 2:
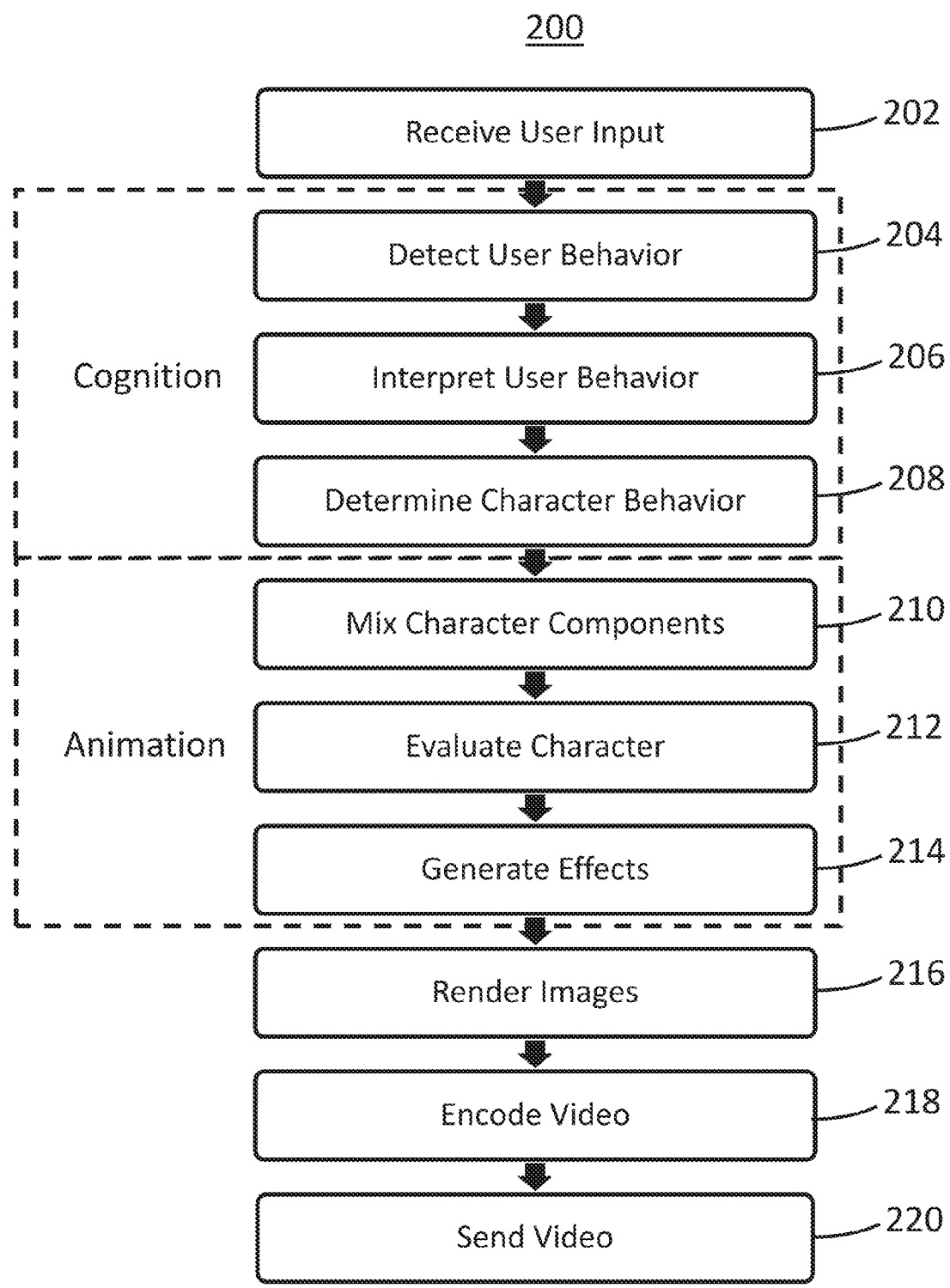
FIG. 2 depicts a flow chart of an exemplary process for generating an interactive computer-generated animation.

FIG. 2 depicts a flow chart of an exemplary process 200 for generating an interactive computer-generated animation. Process 200 provides a personalized interaction with a virtual animated character.

In block 202, user input is received from a client device. A client device may include, for example, a personal computer, smartphone, tablet computer, camera, depth camera, microphone or the like. The client device may include various input devices and/or sensors to receive user input. The user input can include inputs to a device such as, for example, a keyboard, keypad, touch-sensitive pad, touch-sensitive screen, camera, depth camera, microphone, or the like, associated with the client device. The user input can also include an action, position, or posture made by the user of the client device. An action, position, or posture of a user may be input via a sensor that can capture an image or depth buffer of the user (e.g., a camera) or a sensor such as an accelerometer or gyroscope that can detect the user's movement or position. The user input can also include sounds made by the user, which may be collected by an audio sensor such as a microphone.

In one embodiment, the user input is in response to video displayed on the client device. For example, the video may include a virtual environment having a character that the user of the client device interacts with via inputs to the client device.

In block 204, user behavior is detected based on the user inputs received in block 202. In one embodiment, the detected behavior is used to determine what the user is doing. The detected behavior may be based on user input data from a client device. Detected actions, positions, or postures may be categorized. Low-level categories of detected behavior may include descriptions such as "raised hand" or "mouth moved," or even "motion detected" or "eye position detected." Higher-level categories may include descriptions, such as "waiving" or "smiling."

In one embodiment, image data from the client device is analyzed to determine that the user is looking in a particular direction, moving his/her head or mouth, raising his/her arm, or the like. In another embodiment, data from motion sensors may be used to determine how the user is moving. The sensor data may indicate, for example, that the user is walking, raising his/her arm, or the like.

In block 206, user behavior is interpreted based at least in part on the behavior detected in block 204. The detected behavior (or data representing the detected behavior) may be analyzed to determine what the behavior was intended to convey. For example, detected motion of the user's mouth may be interpreted as a smile. As another example, detected movement or position of the user's eyes may be interpreted as a suggestion to the character to move where the user is looking. As yet another example, motion of a user's head may be interpreted as an indication of agreement (e.g., nodding) or disagreement (e.g., shaking). Depending on the embodiment, behavior such as a smile may be considered a low-level interpretation, whereas an indication of agreement may be considered a higher-level interpretation.

In one embodiment, a heuristic algorithm may be used to interpret user behavior based on past behavior or inputs. The interpretation of a detected behavior changes over time as the process adapts by learning to understand the message a user intends to convey with certain behavior.

Although perception and interpretation are described above as two distinct steps, it should be recognized that the two steps may at least partially overlap. In the embodiments described above, for example, behavior perception includes determining that the user's head has moved in a certain direction, while behavior interpretation includes determining that the motion is a nod and that a nod is a sign of agreement. Alternatively, determining that the user is nodding may be included in the perceiving step. In either case, user motion is detected and eventually interpreted as a sign of agreement.

Moving to block 208, a character behavior is determined. In one embodiment, the client device displays a computer-generated animation including a virtual environment having an animated character with which the user interacts. The behavior of the animated character may be determined based at least in part on the user's behavior, as detected and interpreted in blocks 204 and 206. The character behavior includes any type of motion, reaction, or change in the character that can be animated. For example, if it is determined that the user is smiling, the animated character may smile back, wave hello, or say a particular phrase (e.g., "what a lovely smile you have").

In one embodiment, the character behavior associated with a particular user behavior is predetermined. For example, it may be predetermined that a character should perform behavior A each time a user's behavior is interpreted to be behavior B. That is, it may be predetermined that character behavior A will be determined in response to user behavior B. The character behavior may be to take an affirmative action, or alternatively, to do nothing in response to the user's input.

In one embodiment, the behavior determined for a character changes over time for the same input. In response to a first input at a first time, the character performs a first behavior, but when the first input occurs again at a second time, the character performs a second behavior. A heuristic algorithm may be used to determine character behavior based on past experiences or user inputs so that the character's response to a particular user input changes over time as the character learns to respond to certain user behavior.

In another embodiment, a user can also learn to interact with the character over time. For example, a character may not move in response to direct verbal or physical commands. Instead, to get the character to move to a different location, the user has to learn to look in the particular direction in which he/she wants the character to move.

It should also be recognized that the character does not necessarily rely on user input to perform behavior. A character may perform a behavior spontaneously or periodically that is not in response to a user input. The character may also do something to prompt the user to provide an input. The character may prompt the user if, for example, no user behavior is detected for a predetermined amount of time. In one example, the character behavior is intended to prompt the user to take a desired action. In this way, the character may attempt to lead the user, while the perception system monitors the user's actions and determines whether the desired action is performed. Further character behavior may then be determined based on whether the user provided the desired response.

It should be recognized that some detected behaviors may not be able to be interpreted. In one embodiment, the character has a determined behavior when the detected behavior cannot be interpreted. For example, the character may make a confused face or shrug its shoulders to communicate that the user's behavior is unclear.

Once the character behavior has been determined, the behavior may be animated in blocks 210, 212, and 214. In block 210, character components are mixed for animation. Mixing takes data underlying the animation and combines, or mixes, it into a clip. The underlying animation data may include curves, expressions, and constraints that make up the geometry of a character.

In block 212, the character is evaluated. Character evaluation includes deforming or manipulating the geometry of a character so that the character appears to perform the determined behavior.

In block 214, animation effects are generated. Animation effects may include motion of additional elements in the animated scene, such as clothes, hair, or feathers.

In block 216, images of the computer-generated environment are rendered. Rendering produces an image of the virtual environment for a specific perspective at an instant in time. An animated video is generated by rendering images over a sequence of times.

In block 218, the animated video is encoded to prepare the video for transmission or streaming to a client device. Encoding may include compressing the video to reduce the amount of data required to represent the rendered images. A video compression format such as the H.264 video compression format may be used. Encoding may be performed by a processor or computer program, such as a coder-decoder (CODEC), capable of encoding or decoding a digital data stream.

In block 220, the encoded video is sent to a client device for decoding and display. A user may provide further input in response to the updated video to continue interaction with the animated character, in which case the further input is received and processed by repeating process 200.

Figure 3:
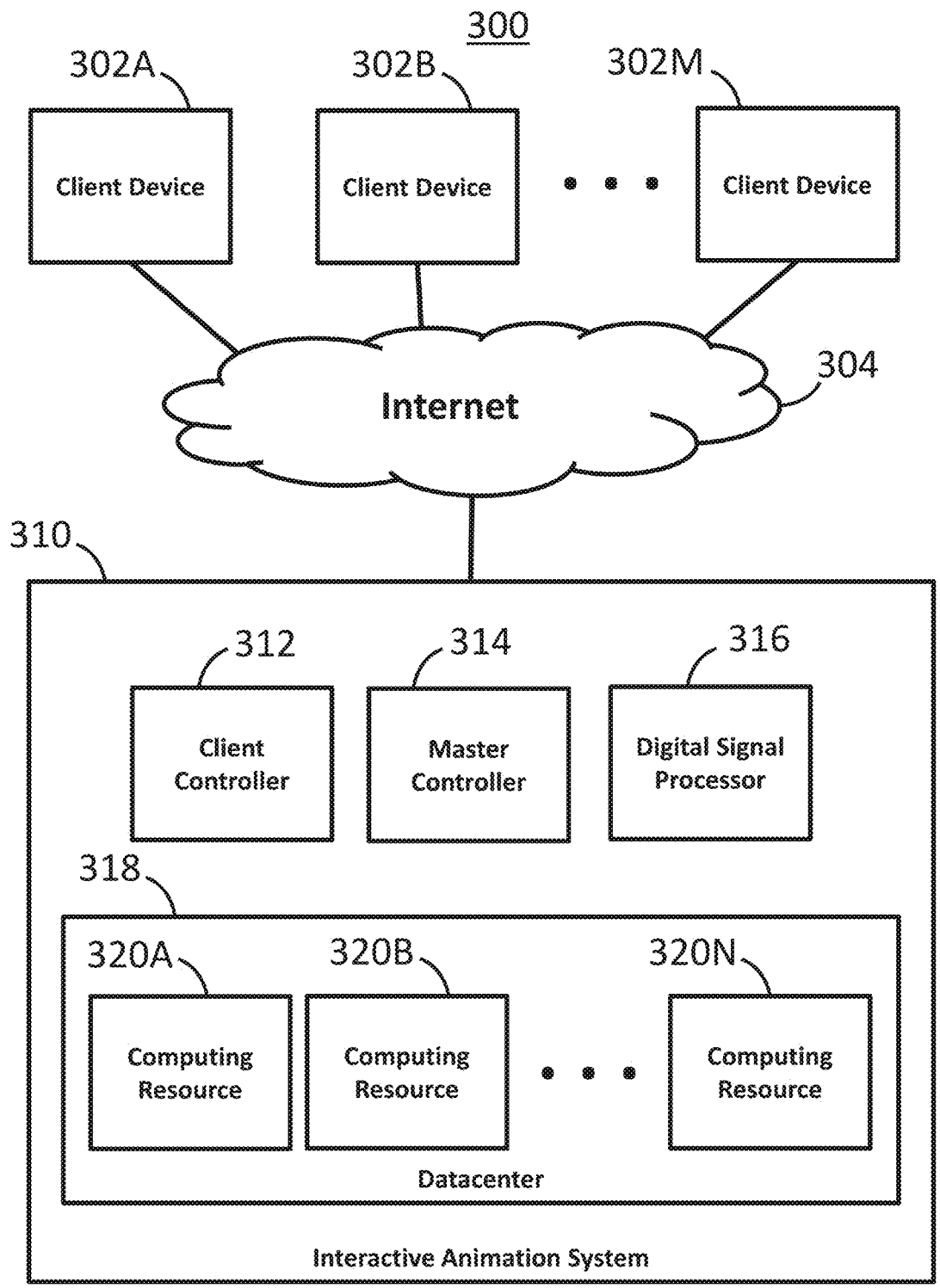
FIG. 3 depicts a block diagram of an exemplary system for performing a computer processing service on behalf of a client device.

FIG. 3 depicts a block diagram of an exemplary system for performing a computer processing service, such as the interactive animation process 300, on behalf of one or more client devices. The processing associated with any block, or portion thereof, in process 300 may be performed by a single processor or distributed among more than one processor. A single processor may perform computations associated with one or more block, or portion thereof, in process 300. The system 300 includes client devices 302A-302M connected to an interactive animation system 310 via the Internet 304. The interactive animation system 310 includes a digital signal processor 316, client controller 312, master controller 314, and datacenter 318. The digital signal processor 316, client controller 312, and master controller 314 may be implemented on one or more processors included in the interactive animation system 310. The datacenter 318 includes a plurality of computing resources 320A-320N to perform computations. The computing resources 320A-320N may include one or more processors or memory storage devices.

The interactive animation system 310 may include an input device such as a port or antenna to receive user input from the client device. The interactive animation system 310 may also include one or more processors (e.g., the computing resources 320) configured to detect user behavior, interpret user behavior, and determine character behavior, as described with reference to blocks 204, 206, and 208. The interactive animation system 310 may also include one or more processors configured to mix character components, evaluate a character, and generate effects, as described with reference to blocks 210, 212, and 214. The interactive animation system may also include one or more rendering processors configured to render computer-generated images, as described with reference to block 216.

As described in greater detail below, the client controller 312 serves as an interface between the client devices 302A-302M and the rest of the interactive animation system 310. The client controller 312 obtains information about the user and the client devices 302, and also monitors the status of the interaction with the animated character. The master controller 314 provides centralized processing responsible for managing resource consumption within a hardware domain, such as the datacenter 318.

Process 200 and the interactive animation system 300 may be configured to provide a personalized interaction with a virtual animated character. The quality of service desired by a user may require interaction in real-time or near-real-time. Near real-time interaction includes response times of 200-250 ms, which are close to the response time of an average human to visual stimulus. The quality of service for an interactive system may be referred to as quality of interaction. Quality of interaction may depend on the video resolution, level of system availability, character and scene resolution, frame time, scene update rate, or the like. The quality of interaction may also represent a percentage of time that the system is available or an approximate percentage of frames that will be fully updated based on the selected frame rate and complexity of the interaction and environment.

The quality of interaction selected by a user may also determine the scenes, environments, and/or characters with which the user may interact. The complexity of the interactions that are available to the user may also be determined based on the quality of interaction. Complexity includes the number and types of characters and/or objects, the recognizable user behaviors, and the character reactions and/or behaviors.

As discussed above, however, depending on the complexity of the interaction and computer-generated environment, the computational demands of process 200 may make it difficult to maintain a desired quality of service. Providing a desired quality of service or interaction may be even more difficult when attempting to serve multiple clients simultaneously.

The process described below provides an adaptable time-based scheduling scheme that attempts to maintain a desired quality of interaction with the computer-generated character. Each computation is performed at a specified time, as opposed to being performed in response to a triggering event. A computation begins at its predetermined start time at each iteration of the process (e.g., each frame) regardless of whether the data used by the computation has been updated since the previous iteration. Monitoring is performed to determine whether each packet of data is being output or updated in time for use by subsequent computations that use that data as input. Over time, the system may alter various parameters and allocate additional resources to attempt to maintain a desired quality of interaction.

Figure 4:
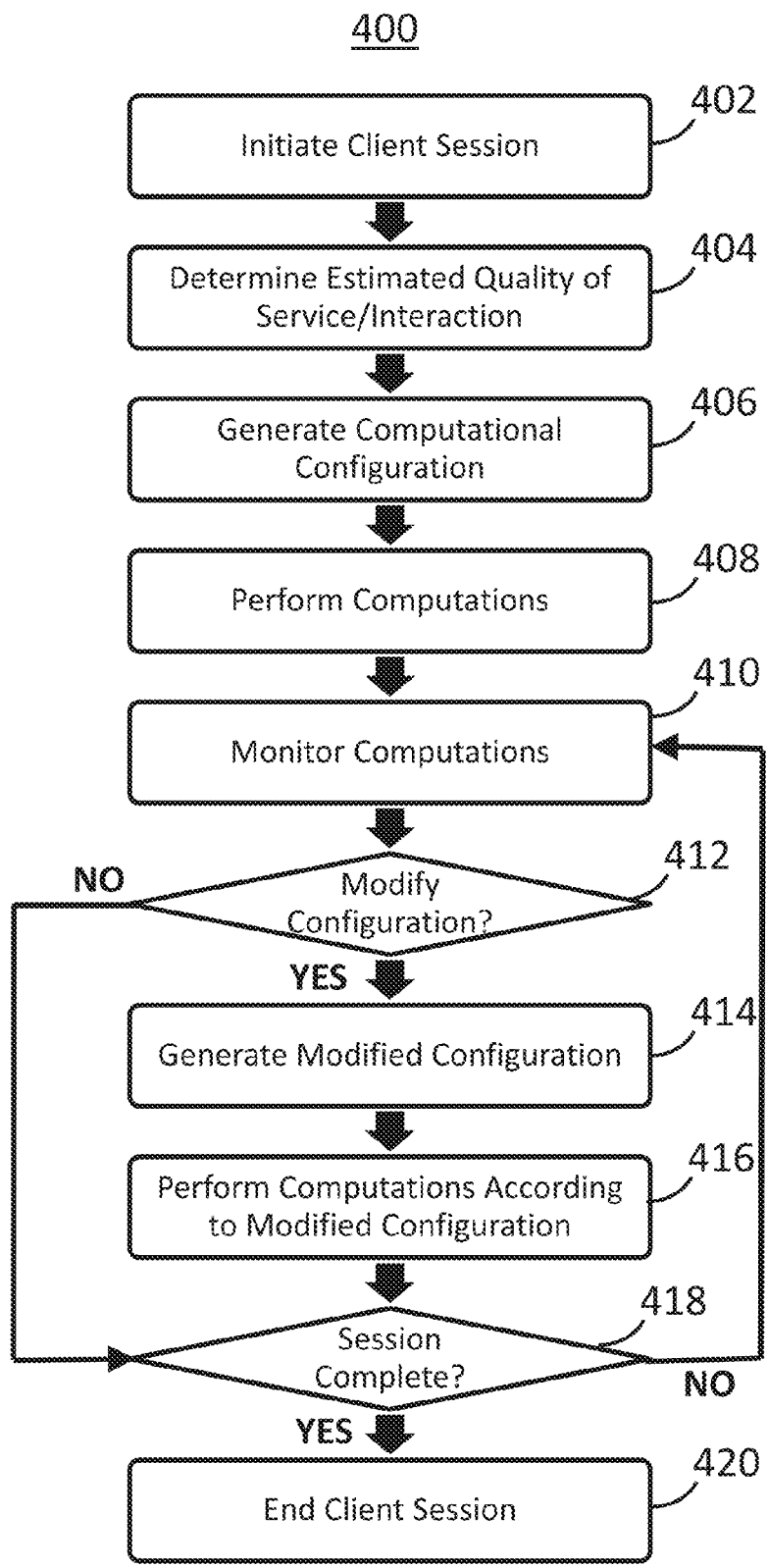
FIG. 4 depicts a flow chart of an exemplary process for scheduling and performing computations for generating an interactive computer-generated animation.

FIG. 4 depicts a flow chart of an exemplary process 400 that uses monitored, time-based scheduling to perform a service, such as the interactive animation process 200, on behalf of a client device. By way of example, process 400 is described with reference to exemplary interactive animation system 300 shown in FIG. 3.

In block 402, a client session is initiated. In one embodiment, a client device 302 initiates a connection with interactive animation system 310, which then instantiates a client controller process associated with the client device. As part of the client controller process, the client controller 312 obtains information associated with the client device 302 or the user of the client device 302. User information may include the user's name, preferences, history, or the like. Device information may include the type of device, operating system, processing and memory capabilities, or the like.

The client controller 312 may also obtain the types of interactions that are available to the user, as well as a description of the interaction selected for the current session. A user may be able to purchase different packages that provide the user with selected interactions and a selected quality of interaction. The package may determine the scenes, environments, and/or characters with which the user may interact. The interaction package may also determine the complexity of the interactions that are available to the user. The level of interaction complexity may include the number and types of characters, the recognizable user behaviors, and the character behaviors.

In block 404, an estimated quality of interaction for the client is determined. The estimated quality of interaction may be determined based on factors such as the user's information, the intended interaction, the load on the interactive animation system 310 (e.g., number of active or anticipated client sessions), network connection speed, and the capabilities of the interactive animation system 310. The capabilities relevant to determining the estimated quality of interaction include the computing resources available (e.g., number and speed of processors). Notably, the estimated quality of interaction may differ from the desired or selected quality of interaction due to the status of these factors at the time the interaction is requested.

In block 406, a computational configuration is generated for the computations that produce the interactive computer-generated animation. The computational configuration includes an identification of the computations required to generate the interactive animated video in response to user input from the client device 402. A computation can be any computational operation or process, or portion thereof. In the interactive animation system 410, a computation may include, for example, one or more of the tasks described in process 200, such as determining character behavior, evaluating a character, rendering an image, or some portion of these tasks.

The configuration includes parameters that are determined in order to meet the desired quality of interaction. In one embodiment, the master controller 314 obtains the desired quality of interaction from the client controller 312 and generates a configuration that satisfies the quality of interaction. The client controller 312 may inform the master controller 314 of the user's identity, what quality of interaction the user has a right to expect, and a description of the intended interaction (e.g., which characters to run and in what environment they will be rendered).

The configuration may include the inputs and outputs for each computation. The relationships between the computations are also included in the configuration, including the order in which the computations are performed and the data flow and dependencies between computations (e.g., which preceding computation(s) provide the input(s) for each subsequent computation). The configuration may include start times at which each computation is to begin and end times before which each computation is to end. The configuration may also include a latency associated with each computation that represents the amount of time allocated for the computation to be completely performed. The end time for each computation may be determined based on the sum of the start time and the latency allocated to the computation. The start time and end time define a time interval within which the computation is to be completely performed, while the latency represents the duration of that time interval.

The configuration may also include a transfer time that represents an allocated amount of time to transfer the data produced by the computation (i.e., an amount of time allocated to transfer output data to downstream computations). In one embodiment, the transfer time is included in the allocated latency. The configuration may also include the processing location(s) for each computation (i.e., which processor(s), or portion(s) thereof, will perform the computation). The configuration parameters may be stored in a configuration file.

In one embodiment, the latency allocated to each computation is determined based on data collected from previous client sessions. The data may be collected from the current user or other users that have had interactions similar to the one the current user is requesting. In one embodiment, the interactive animation system 310 has knowledge of the available processing resources in order to identify the locations for the computations. For example, the master controller 314 may store data representing the locations and speeds of the processors in the datacenter 318.

As an example, consider a Character Evaluation that includes evaluation of two characters in every frame at a frame rate of 30 frames per second (33.3 ms frame time) and a specified character complexity. The complexity of a character depends on parameters such as the character's resolution, rig complexity, and planned motion. Character resolution includes the number or spacing of sample points that define the geometry of the characters. Note that character resolution is distinguishable from the image resolution, which includes the number of sample points in a rendered image of the animated scene.

In one embodiment, the master controller 314 accesses a Character Evaluation Table, which, for each character, includes an estimated amount of time in which the character can be evaluated. The table may also provide information of what mesh quality is expected for the estimated time as well as the estimated size of the output data, which may be needed to estimate the time required to transfer the output data to downstream computations. For each type of processor in the datacenter 318, the table stores estimated times to evaluate a character at a particular complexity level (e.g., resolution). The table may also include estimated computation times, or expected reductions in computation time, depending on the number of processors allocated to the computation. The memory required to produce a particular character resolution may also be stored in the table. The table may also be used to allocate a latency for a computation or to determine the number of processors that must be assigned to a computation to achieve an allocated latency. Similar data or tables of data may be available for other computations.

There may be various ways of achieving a desired performance for the Character Evaluation computation. For example, the two evaluations may be run in parallel such that each has its own character evaluation sub-computation. Alternatively, both character evaluations may be run in one computation at twice the speed so that the computation takes the same amount of time as if the evaluations were run in parallel.

For some computations, the latency of the computation (i.e., the amount of time required for a single instance of the computation to perform the computation and provide its output) may be greater than the frame time. It may be possible to reduce the time to perform a computation by dividing the computation into sub-computations such that at least some of the sub-computations can be performed in parallel. The sub-computations must be properly scheduled so that each has the required input(s). This alternative may allow the computation to be performed within the frame time but at the cost of additional processing resources (e.g., use of more processors).

Depending on the quality of service or quality of interaction that is desired, however, a computation with a latency greater than the frame time may be acceptable. In an embodiment in which the latency of a computation is acceptable but is greater than the frame time, multiple instances of the computation may be created such that each instance performs the entire computation for a particular frame. As discussed in greater detail below, the computations may be scheduled such that the instances produce outputs at the desired frame rate, but with an initial delay.

In one embodiment, the number of instances is the number of frames required to perform the computation, rounded up to the nearest integer. That is, the number of instances (n) is: n=ceiling (Latency of the computation/Frame time).

The frames associated with the n instances may be consecutive frames in a sequence of frames separated by the frame time. The instances may be scheduled such that, after an initial delay, the outputs of the instances are provided at the desired frame rate. The initial delay may be the amount of time it takes for a single instance to perform the computation, less one frame. Although this alternative results in a delayed response, it provides a smooth display once it has begun.

For example, consider an application with a desired frame rate of 30 fps (33.3 ms frame time) that receives a user input resulting in a determined character response. The Character Evaluation computation associated with the determined response has a 100 ms latency (3 frames). Accordingly, three instances of the computation are created. Each instance takes 100 ms to perform the Character Evaluation for a single frame. Assuming the user input occurs at time t=0, and ignoring all other latencies (e.g., user behavior interpretation, character behavior determination, configuration setup, etc.), the determined character behavior will be delayed by three frames due to the latency of the computation, and will begin at the fourth frame (e.g., 100 ms) after the user input. The instances may be run at least partially in parallel with staggered outputs such that instances 1-3 provide the outputs for frames 4-6, which begin at times 100 ms, 133.3 ms, and 166.6 ms, respectively. If the determined behavior lasts longer than three frames (i.e., past frame 6), instance 1 can perform the computation again (with updated parameters) for frame 7 at 200 ms. That is, in the example provided, each instance may perform the computation for every third frame for as long as the behavior lasts.

This alternative may be desirable for cases in which some amount of delay in the system's response (e.g., character response) is acceptable. Furthermore, it should be recognized that a combination of the two techniques described above involving multiple instances of a computations and division of a computation into sub-computations may be implemented depending on the quality of service or interaction desired.

Figure 5A:
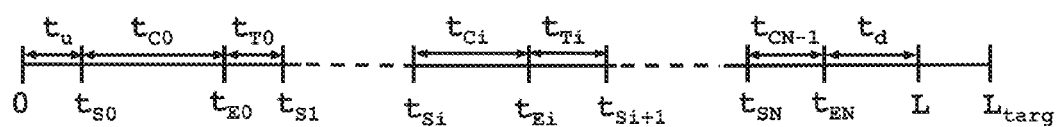
FIGS. 5A-5B depict exemplary timelines for a configuration of computations.

FIG. 5A depicts an exemplary timeline for a single iteration of a process, such as the computations required to produce a frame of an animated video. FIG. 5A illustrates the scheduled start time, latency, and transfer time for each of N computations $C_i$, where i=0, 1, . . . , N−1.

Time $t_{Si}$ is the time at which the computation $C_i$ is scheduled to begin. Time $t_{Ci}$ is the latency or duration of time that is allocated for performing the computation $C_i$. Time $t_{Ei}$ is the time before which the computation $C_i$ is scheduled to end (i.e., the computation $C_i$ is to be completely performed before $t_{Ei}$). Notably, $t_{Ci}$ does not include the network traffic time required to transfer the data produced by the computation $C_i$ to another portion of the system. Instead, time interval $t_{Ti}$ represents the amount of time that elapses after computation $C_i$ completes but before the next computation $C_{i+1}$ begins. It is the allocated amount of time to transfer the data from $C_i$ to $C_{i+1}$. Time $t_u$ is the amount of time to upload client data from the client device 302, and time $t_d$ is the amount of time allocated to download encoded video data to the client device 302. The computations are configured such that all N computations are completed within a target total latency $L_{t\ arg}$.

As shown in FIG. 5A, the allocated total latency L may be less than the target total latency $L_{t\ arg}$. The allocated total latency can be represented as:

$$L = t_u + t_d + \sum_{i=0}^{N-1} (t_{Ci} + t_{Ti}),$$

where $t_{TN-1}=0$ because $t_d$ accounts for the amount of time required to transfer data to the client device following the last computation $C_{N-1}$.

The latency $t_{Ci}$ and transfer time $t_{Ti}$ allocated to each computation $C_i$ may be based on several factors including cost, past experience, and physical properties of the interactive animation system. For example, the allocated latency $t_{Ci}$ may be based in part on the speed of the processor(s) that will be performing the computation $C_i$ and the amount of resources that will be devoted to the computation (e.g., the number of processors), as well as actual measured latencies of previous occurrences of computation $C_i$.

In one embodiment, the configuration applies the same timeline for each iteration. Every computation $C_i$ is allocated a latency $t_{Ci}$ and transfer time $t_{Ti}$ in each iteration, regardless of whether the computation is actually required for that iteration. Furthermore, a computation is allocated the same time interval within each iteration, relative to the start of the iteration. Thus, the time at which a computation is to start may be predetermined for every iteration.

Figure 5B:
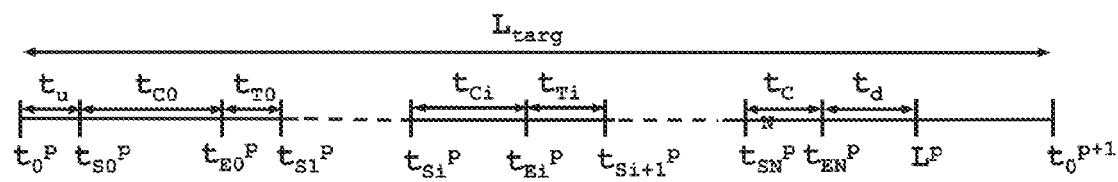

FIG. 5B illustrates the computation timeline for an arbitrary iteration p. The scheduled start time $t_{Si}^p$ for computation $C_i$ during iteration p depends on the iteration p, the target latency $L_{t\ arg}$, and the start time relative to the beginning of the iteration $\Delta t_{Si}$ according to the equation:

$$t_{Si}^p = p*L_{t\ arg} + \Delta t_{Si}, \text{ where } \Delta t_{Si} = t_{Si}^0.$$

In this context, the target latency $L_{t\ arg}$ is the time allotted to the full computation for a frame.

Notably, FIGS. 5A and 5B include only the computations on the critical path of the configuration. Of all the computations that require the same input, the computations on the critical path (i.e., the slowest path) are the computations that are allocated the most amount of time to complete and transfer their data. However, there may be other computations that occur in parallel with the computations $C_i$ on the critical path. For example, let set D represent all computations that immediately follow and depend on the output of critical computation $C_i$ (i.e., $C_i$ is a direct prerequisite for each computation in D). Each computation $D_j$ in D has an allocated latency $t_{Dj}$ and transfer time $t_{Rj}$. Accordingly, computation $C_{i+1}$ is the computation $D_k$ in set D with the greatest combined allocated processing time $t_{Dk}$ and transfer time $t_{Rk}$. That is, if D includes M computations, $C_{i+1}=D_k$, where $D_k$ is the computation that maximizes $t_{Dj}+t_{Rj}$ (j=0, . . . , M−1).

Accordingly, $C_0$ is the computation with the longest combined processing and transfer times of the computations that can run at the start of an iteration without input from another computation.

Returning now to FIG. 4, in block 408, the computations are performed according to the configuration determined in block 406. The start of each computation $C_i$ is time-based in the sense that each computation begins at its scheduled time $t_{Si}^p$ independent of whether one or more of the inputs used by the computation have arrived or have been updated since the last iteration. Each computation is performed in response to the occurrence of its corresponding start time. Thus, the start of a computation is not explicitly dependent on when the required inputs have arrived; it is only implicitly dependent on the arrival of the inputs in that the start time is defined such that the inputs are expected to be available at the start time.

Because initiation of the computations is time-based, it is possible that a computation $C_i$ may begin before the data upon which the computation depends is available or before the data has been updated for the current iteration. This may occur if a preceding computation, e.g., $C_{i-1}$, that provides the data has not finished computing or has not output the data before the time the current computation, e.g., $C_i$, is scheduled to begin (i.e., $t_{Si}^p$). The data may also be unavailable at the time the computation is to start even if the preceding computation produces the data within its allocated time interval but takes longer to transfer the data than the allocated transfer time $t_{Ti}$. If the input for the current iteration does not arrive in time, a computation may proceed by using a default input or the input from a previous iteration. Proceeding with a computation without an updated input may be desirable in order to allow the system to maintain a desired total latency. As a result of performing a computation even in the absence of updated inputs, however, some of the information of the animated scene may not be updated for the current iteration.

It should also be recognized that initiating a computation does not require that a preceding computation upon which it depends be terminated prematurely. That is, preceding computations upon which a downstream computation depends may continue or be allowed to finish even if the downstream computation has already started. In some embodiments, a preceding computation continues to produce data and provide the data to a dependent downstream computation as it becomes available, even after the downstream computation has started. Also, a preceding computation may produce outputs at a rate independent of the rate at which a downstream computation is run.

As discussed briefly above, triggering computations based on time differs from an event-based process in which computations are synchronized with an event. Computations are started at a particular time rather than by an event such as the completion of a preceding computation or arrival of data. As a result, certain delays that may occur in an event-based scheme may be avoided. In an event-based scheme, a delay by one computation causes all subsequent computations to be delayed. By contrast, in a time-based scheme, a computation is not pushed back if a preceding computation takes longer than expected or does not finish within its allotted time.

Furthermore, a computation $C_i$ does not begin early if a prerequisite computation finishes in less than its allocated time. Rather, the system will wait until the determined start time $t_{Si}^P$ to begin computation $C_i$. This may be completely acceptable in some situations, such as when the target latency is being met and/or there is no benefit in completing the computations in less time. If the actual total latency is providing the quality of service expected by the user, there may be no advantage to reducing the latency, even if it is possible. For example, it may be possible in some cases to reduce the total latency to less than the frame time. However, producing images faster than the frame rate may result in excess images that have to be discarded or, alternatively, stored and managed for subsequent use thus requiring additional resources.

As discussed in greater detail below, the system may take advantage of extra time to service additional client sessions or increase quality of service. Also, the system may monitor the actual time it takes to complete each computation to rebalance the time allocations such that time is diverted from computations that are overperforming (e.g., finishing in less than their allotted time) and re-allocated to computations that are consistently underperforming (e.g., exceeding their allotted time).

In addition, since the computations can be performed as a service, resources may be reallocated within a single client session or across multiple client sessions. The ability to divert resources from one client session to another may provide for more efficient allocation of the available computational resources. This may reduce the amount of physical hardware required and/or provide greater ability to maintain a desired quality of service without large variations in resource requirements. Being able to reduce variation in resource requirements may be particularly advantageous for embodiments in which the amount of resources is not scalable.

It should also be recognized that computations performed on behalf of a single client device 302 may be located on multiple processors or machines. Since computations within a client session are to start at particular times, it is important to maintain a consistent sense of time across all machines participating in the same client session as there is no explicit synchronization with another event. Although there is no explicit synchronization, however, the timing of the computations is still critical as downstream computations depend on output from prior computations.

To achieve a common sense of time, a system may include a mechanism for synchronizing clocks on different machines. Over time, clock-skew may cause time to vary from clock to clock. The clocks may be re-synchronized, for example, at some defined interval (e.g., every 1024 seconds) or when the offset between clocks exceeds a specific threshold (e.g., 1 ms). For example, the Network Time Protocol (NTP) may be used to achieve sub-millisecond relative accuracy.

Returning to FIG. 4, in block 410, the computations are monitored. Monitoring may be performed in various ways. In one embodiment, the time at which each computation ends and/or the time it takes to completely perform the computation is measured and recorded. The measured time may be compared to the schedule end time or allocated latency to determine whether the computation is consuming more resources (e.g., more processor time) than anticipated.

In another embodiment, the time at which a computation outputs data is recorded. For example, each packet of data may include an output time that specifies the time at which the packet was output. Each packet of data may also include information that identifies the iteration during which the data was created so that a subsequent computation can check the iteration value when it receives the packet. A computation that begins during iteration p but obtains data that was created during an iteration less than p may acknowledge and record that the data is not current. Data having an output time after the end of the current iteration or an iteration value less than the current iteration indicates that the computation producing the data did not output the data in the current iteration before the start of a subsequent computation that relies on that data as input.

When a packet of data is not output on time, a computation may send a notification to the client controller 312. In one embodiment, an underperforming computation that fails to complete within its allocated time reports the delay to the client controller 312 itself. In another embodiment, a subsequent computation that does not receive the input data it requires or receives data from a previous iteration sends a notification to the client controller 312. In yet another embodiment, both the underperforming computation and the subsequent computation send a notification to the client controller 312.

Various criteria may be used to determine whether to report that a computation did not provide data within its allotted time. For example, a report may be sent every time a computation determines that it has not received the required data or that it has received data from a previous iteration. As another example, a report may be sent when the data has not been updated for a threshold number of consecutive iterations or a specified number of times out of a predetermined number of iterations (e.g., M-out-of-N). As yet another example, a report may be sent when the time it takes a computation to complete exceeds a predetermined threshold (e.g., 1.5 times longer than its allotted time).

In block 412, a decision is made whether to modify the configuration of computations. During some client sessions, the computations may be started at their predetermined time at each iteration until the last iteration is complete and the service on behalf of the client is terminated. However, if a computation frequently or consistently takes longer than the allocated time or does not deliver its output to other computations on time, it may be inferred that insufficient processing resources are assigned to the task given the amount of work being done and the amount of output data being transferred.

Consider a configuration with a first computation that outputs data and a subsequent second computation that is configured to depend on the data as an input. If it is determined that the time at which the first computation outputs the data is after the start time of the second computation, a decision may be made as to whether the configuration is to be modified. The criteria upon which this decision is made may be similar to the ones described above for whether a computation should report that data is not being delivered on time. For example, the configuration may be modified every time a computation fails to completely perform before its end time or does not provide its output data before the start time of the second computation. Other examples include making changes to the configuration when data from a computation is late for a threshold number of consecutive iterations or when the data is late a certain number of times out of a predetermined number of iterations (e.g., M-out-of-N). Still other examples include reconfiguring the configuration when a certain number of computations fail to complete within their allotted time or when the actual computation time exceeds a predetermined threshold (e.g., 1.5 times longer than its allotted time).

The criteria for modifying the configuration may depend on the computation or data being analyzed. Some data may be more critical in the sense that it has a larger impact than other data on the quality of interaction provided on behalf of the user. The criteria for modifying the configuration may be less demanding when important data is not output on time. In contrast, greater or more frequent delays may be more acceptable for less critical data.

Even if the criteria for modifying the configuration are met, however, it may be determined that the configuration should not, or cannot, be changed. For example, if there are no additional resources available and changing the timeline of the current configuration would have an unacceptable effect on the quality of interaction, then the configuration may remain unchanged.

If the criteria for modifying the configuration are not met or the configuration is not to be changed, process 400 proceeds to block 418, in which a determination is made as to whether the client session is complete. If the session is complete, the client session is ended, as indicated by block 420. Ending the client session may include releasing the resources that had been allocated to the client session to make them available to future client sessions. Alternatively, the newly available resources may be allocated to other sessions currently running to increase the quality of interaction. If the session is not complete, process 300 returns to block 310 and continues to monitor computations as the session proceeds according to the current configuration.

Instead, if the decision is made to modify the configuration, then the process moves to block 414 and a modified configuration is determined. There are various ways in which the configuration may be modified. Consider again a configuration with a first computation that outputs data and a subsequent second computation that is configured to depend on the data as an input. As one example, when the first computation does not output its data before the second computation begins, the computational resources devoted to the first computation are increased. Resources may be increased by, for example, assigning additional processors to the first computation or directing the first computation to faster processors.

In one embodiment, the client controller 312 requests that the master controller 314 assign another processor to the first computation. The master controller 314 may allow the request and assign additional processing capability to the first computation. Alternatively, the master controller 314 may deny the request, but propose an alternative solution based on the problem and the information that the master controller 314 has about the computing resources in the datacenter 318.

The configuration may also be modified by increasing (i.e., delaying) the start time $t_{S2}$ of the second computation. Also, the allocated latency for the first computation $t_{C1}$ may be increased or the end time of the first computation $t_{E1}$ may be increased. The total latency L may also be increased to account for delaying the start time of the second computation or extending the allocated latency of the first computation. To compensate for extending the time allocated to the first computation, the allocated latency for another computation may be decreased so that the total latency does not change. For example, the allocated latency for a computation that consistently finishes in less than its allocated time may be reduced.

Resources can be reallocated within a single client session or across multiple client sessions. For example, resources may be diverted from a computation being performed on behalf of one client and reallocated to a computation for a different client.

Extending the allocated latency for underperforming computations or postponing subsequent computations may be the most desirable solution, especially if it can be done without causing the total latency to exceed the target latency $L_{t\ arg}$. If the target latency $L_{t\ arg}$ cannot be consistently met, it may be possible in some embodiments to decrease the frame rate without having a significant impact on the quality of service or interaction. For example, there may be some interactions in which a high frame rate is not critical and reducing it would not severely impact the quality of interaction. This may be true for interactions that do not require rapid user responses or in which the user does not expect quick reactions to input. Although decreasing the frame rate may reduce the responsiveness of an interaction, it can provide greater image quality by allowing each frame to be more fully updated when it is displayed.

The configuration may also be modified by reducing the operations required to perform the first computation. For example, the number of operations may be reduced by decreasing character or image resolutions, relaxing tolerances, or changing other parameters affecting the demands of the computation. In one embodiment, the first computation autonomously attempts to reduce the resources it demands by including instructions to modify parameters such as those mentioned above. Also, some processes, such as rendering, can reduce computational demand by simply truncating the process when some time limit is reached so that the computation fits in exactly the allotted time. However, the ability to stop at an intermediate time may be more difficult or ineffective for other computations.

The modified configuration parameters may be implemented in a new or modified configuration file. In one embodiment, the new or modified configuration is generated by the master controller 314 and includes a new timeline with a different frame time $t_F$ and new start times $t_{Si}$, end time $t_{Ei}$, and allocated computation times $t_{Ci}$ for each computation $C_i$. The client controller 312 then notifies each computation $C_i$ of its updated location, start time $t_{Si}$, end time $t_{Ei}$, and allocated computation time $t_{Ci}$.

Moving to block 416, the computations are performed according to the modified configuration.

In block 418, it is determined whether the session is complete. If the session is not complete, the process returns to block 410 and the computations are monitored in relation to the modified configuration. If the session is complete, the client session is ended as discussed above.

It should be recognized that although process 400 is described with reference to an interactive animation service, the process is not limited to interactive animated computer-generated systems, and certain aspects may be applied or adapted to other applications. Alternative applications may include other computer-generated animation processing applications, such as feature film production. Aspects of the disclosed processes may also be applied to provide a service on behalf of a client device in which the application is non-interactive or does not involve animation. The disclosed scheduling techniques may be advantageously incorporated into any application in which a reliable or deterministic output rate of a computational process is required. Such applications may include, for example, driver software for animatronic or robotic devices, scientific, training and commercial visualization systems, as well as any systems in which scalable, predictable, controllable response times are important.

It should also be recognized that the time-based approach described above does not necessarily have to be applied to all computations performed on behalf of a client device. Some computations, or portions thereof, may proceed according to a time-based approach, while others may be performed using a different technique. As mentioned above, under the time-based approach, if a prerequisite computation finishes in less than its allocated time, a subsequent computation will wait until its scheduled start time instead of beginning early. However, it may be desirable for some identified portion(s) of a service to run as fast as possible. To minimize idle time, an event-based process might be used for the identified portion(s) so that each computation begins as soon as the preceding computation is complete. A time-based process may then be initiated or resumed upon completion of the identified portion(s).

Figure 6:
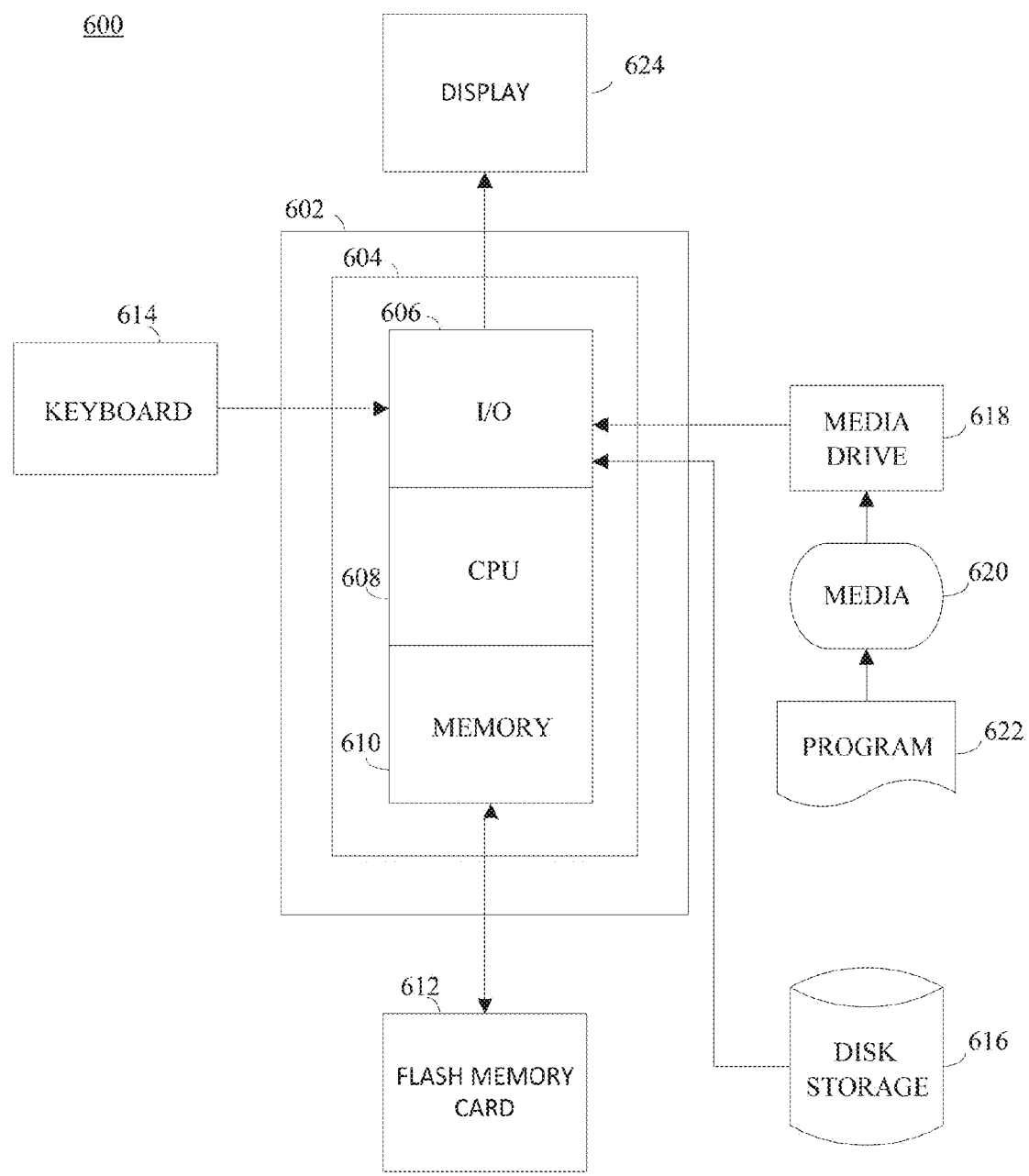
FIG. 6 depicts an exemplary computing system.

Turning now to FIG. 6, components of an exemplary computing system 600, configured to perform any of the above-described processes, are depicted. In some embodiments, the client device 302, interactive animation system 310, client controller 312, master controller 314, digital signal processor 316, datacenter 318, and/or computing resource 320 described above may include some or all of the elements of computing system 600. Computing system 600 may include, for example, a processor, memory, storage, and input/output devices (e.g., monitor, keyboard, stylus, drawing device, disk drive, Internet connection, etc.). However, computing system 600 may include circuitry or other specialized hardware for carrying out some or all aspects of the processes described above.

In some operational settings, computing system 600 may be configured as a system that includes one or more units, each of which is configured to carry out some aspects of the above-described processes either in software, hardware, or some combination thereof. For example, computing system 600 may include a cognitive processing unit that includes one or more processors configured to detect user behavior, interpret user behavior, and/or determine character behavior, as described with reference to blocks 204, 206, and 208. Computing system 600 may also include an animation processing unit that includes one or more processors configured to mix character components, evaluate a character, and/or generate effects, as described with reference to blocks 210, 212, and 214. Computing system 600 may also include a rendering unit and encoding unit, each including one or more processors configured to render and encode computer-generated images, as described with reference to blocks 216 and 218.

In computing system 600, the main system 602 may include a motherboard 604 with a bus that connects an input/output (I/O) section 606, one or more central processing units (CPU) 608, and a memory section 610, which may have a flash memory card 612 related to it. Memory section 610 may contain computer-executable instructions and/or data for carrying out process 200 or process 400. The I/O section 606 may be connected to display 624, a keyboard 614, a disk storage unit 616, and a media drive unit 618. The media drive unit 618 can read/write a non-transitory computer-readable storage medium 620, which can contain programs 622 and/or data.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

I claim:

1. A method of scheduling and performing computations for generating an interactive computer-generated animation on behalf of a client device to achieve a desired quality of service, the method comprising:
   generating a computational configuration of computations for a first frame of the computer-generated animation that when performed produces the computer-generated animation with the desired quality of service, the computational configuration for the first frame comprising:
      an identification of a first computation configured to output first data when the first computation is performed;
      a first start time in creating the first frame at which the first computation is to begin;
      a first end time in creating the first frame before which the first computation is to end;
      an identification of a second computation configured to depend on the first data as an input; and
      a second start time in creating the first frame at which the second computation is to begin, wherein the second start time is after the first end time;
   performing the first computation and the second computation according to the computational configuration to create the first frame of the computer-generated animation, wherein performing the first computation and the second computation according to the computational configuration comprises:
      performing the first computation in response to an occurrence of the first start time; and performing the second computation in response to an occurrence of the second start time;

monitoring the performance of the first computation during creation of the first frame of the computer-generated animation, wherein monitoring the performance of the first computation includes determining the time at which the first computation outputs the first data;

modifying the computational configuration to create a modified computational configuration, wherein modifying the computational configuration is performed in response to a determination that the time at which the first computation outputs the first data is after the second start time; and performing the first computation and the second computation according to the modified computational configuration to create a second frame of the computer-generated animation.

2. The method of claim 1, wherein the second computation is performed in response to the occurrence of the second start time independent of whether the first computation ends before the second start time.

3. The method of claim 1, wherein modifying the computational configuration includes increasing the first end time.

4. The method of claim 1, wherein modifying the computational configuration includes increasing the second start time.

5. The method of claim 1, wherein modifying the computational configuration includes decreasing the first start time.

6. The method of claim 1,
wherein the computational configuration further comprises first resource data representing a first computational resource upon which a first portion of the first computation is to be performed, and
wherein modifying the computational configuration includes adding to the computational configuration second resource data representing a second computational resource upon which a second portion of the first computation is to be performed.

7. The method of claim 1,
wherein the first computation includes a number of operations, and
wherein modifying the computational configuration includes reducing the number of operations in the first computation.

8. The method of claim 1, wherein the computational configuration is generated based on past performance of the first computation and the second computation.

9. The method of claim 1, wherein the computations determine a behavior of an animated character based on a user input to the client device.

10. The method of claim 1,
wherein the quality of service includes a target latency that defines an amount of time in which the computations for a frame of the computer-generated animation are to be completely performed, and
wherein the computational configuration is generated such that the computations for the frame are completed in a lesser amount of time than the target latency.

11. A system for scheduling and performing computations for generating an interactive computer-generated animation on behalf of a client device to achieve a desired quality of service, the system comprising:
at least one computing resource configured to:
generate a computational configuration of computations for a first frame of the computer-generated animation that when performed produces the computer-generated animation with the desired quality of service, the computational configuration for the first frame comprising:
an identification of a first computation configured to output first data when the first computation is performed;
a first start time in creating the first frame at which the first computation is to begin;
a first end time in creating the first frame before which the first computation is to end;
an identification of a second computation configured to depend on the first data as an input; and
a second start time in creating the first frame at which the second computation is to begin, wherein the second start time is after the first end time;
perform the first computation and the second computation according to the computational configuration to create the first frame of the computer-generated animation, wherein performing the first computation and the second computation according to the computational configuration comprises:
performing the first computation in response to an occurrence of the first start time; and
performing the second computation in response to an occurrence of the second start time;
monitor the performance of the first computation during creation of the first frame of the computer-generated animation, wherein monitoring the performance of the first computation includes determining the time at which the first computation outputs the first data;
modify the computational configuration to create a modified computational configuration, wherein modifying the computational configuration is performed in response to a determination that the time at which the first computation outputs the first data is after the second start time; and
perform the first computation and the second computation according to the modified computational configuration to create a second frame of the computer-generated animation.

12. The system of claim 11, wherein the second computation is performed in response to the occurrence of the second start time independent of whether the first computation ends before the second start time.

13. The system of claim 11, wherein modifying the computational configuration includes increasing the first end time.

14. The system of claim 11, wherein modifying the computational configuration includes increasing the second start time.

15. The system of claim 11, wherein modifying the computational configuration includes decreasing the first start time.

16. The system of claim 11,
wherein the computational configuration further comprises first resource data representing a first computational resource upon which a first portion of the first computation is to be performed, and
wherein modifying the computational configuration includes adding to the computational configuration second resource data representing a second computational resource upon which a second portion of the first computation is to be performed.

17. The system of claim 11,
wherein the first computation includes a number of operations, and
wherein modifying the computational configuration includes reducing the number of operations in the first computation.

18. The system of claim 11, wherein the computational configuration is generated based on past performance of the first computation and the second computation.

19. The system of claim 11, wherein the computations determine a behavior of an animated character based on a user input to the client device.

20. The system of claim 11,
wherein the quality of service includes a target latency that defines an amount of time in which the computations for a frame of the computer-generated animation are to be completely performed, and
wherein the computational configuration is generated such that the computations for the frame are completed in a lesser amount of time than the target latency.

21. A non-transitory computer-readable storage medium comprising computer-executable instructions for scheduling and performing computations for generating an interactive computer-generated animation on behalf of a client device to achieve a desired quality of service, the computer-executable instructions comprising instructions for:
generating a computational configuration of computations for a first frame of the computer-generated animation that when performed produces the computer-generated animation with the desired quality of service, the computational configuration for the first frame comprising:
an identification of a first computation configured to output first data when the first computation is performed;
a first start time in creating the first frame at which the first computation is to begin;
a first end time in creating the first frame before which the first computation is to end;
an identification of a second computation configured to depend on the first data as an input; and
a second start time in creating the first frame at which the second computation is to begin, wherein the second start time is after the first end time;
performing the first computation and the second computation according to the computational configuration to create the first frame of the computer-generated animation, wherein performing the first computation and the second computation according to the computational configuration comprises:
performing the first computation in response to an occurrence of the first start time; and
performing the second computation in response to an occurrence of the second start time;
monitoring the performance of the first computation during creation of the first frame of the computer-generated animation, wherein monitoring the performance of the first computation includes determining the time at which the first computation outputs the first data;
modifying the computational configuration to create a modified computational configuration, wherein modifying the computational configuration is performed in response to a determination that the time at which the first computation outputs the first data is after the second start time; and
performing the first computation and the second computation according to the modified computational configuration to create a second frame of the computer-generated animation.

22. The computer-readable storage medium of claim 21, wherein the second computation is performed in response to the occurrence of the second start time independent of whether the first computation ends before the second start time.

23. The computer-readable storage medium of claim 21, wherein modifying the computational configuration includes increasing the first end time.

24. The computer-readable storage medium of claim 21, wherein modifying the computational configuration includes increasing the second start time.

25. The computer-readable storage medium of claim 21, wherein modifying the computational configuration includes decreasing the first start time.

26. The computer-readable storage medium of claim 21,
wherein the computational configuration further comprises first resource data representing a first computational resource upon which a first portion of the first computation is to be performed, and
wherein modifying the computational configuration includes adding to the computational configuration second resource data representing a second computational resource upon which a second portion of the first computation is to be performed.

27. The computer-readable storage medium of claim 21,
wherein the first computation includes a number of operations, and
wherein modifying the computational configuration includes reducing the number of operations in the first computation.

28. The computer-readable storage medium of claim 21, wherein the computational configuration is generated based on past performance of the first computation and the second computation.

29. The computer-readable storage medium of claim 21, wherein the computations determine a behavior of an animated character based on a user input to the client device.

30. The computer-readable storage medium of claim 21,
wherein the quality of service includes a target latency that defines an amount of time in which the computations for a frame of the computer-generated animation are to be completely performed, and
wherein the computational configuration is generated such that the computations for the frame are completed in a lesser amount of time than the target latency.

* * * * *